United States Patent
Miyanaga

(10) Patent No.: US 9,813,592 B2
(45) Date of Patent: Nov. 7, 2017

(54) IMAGE FORMING APPARATUS, STORAGE MEDIUM, AND COLOR CONVERSION METHOD

(71) Applicant: KYOCERA Document Solutions Inc., Osaka (JP)

(72) Inventor: Yuka Miyanaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/268,770

(22) Filed: Sep. 19, 2016

(65) Prior Publication Data

US 2017/0094129 A1  Mar. 30, 2017

(30) Foreign Application Priority Data

Sep. 25, 2015  (JP) .................................. 2015-188074

(51) Int. Cl.
  *H04N 1/60*  (2006.01)

(52) U.S. Cl.
  CPC ......... *H04N 1/6055* (2013.01); *H04N 1/6008* (2013.01); *H04N 1/6019* (2013.01); *H04N 1/6027* (2013.01); *H04N 2201/0039* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 5,345,863 A * | 9/1994 | Kurata | ....................... | B41J 2/21 101/126 |
| 2007/0296986 A1* | 12/2007 | Watanabe | ................ | H04N 1/62 358/1.9 |
| 2014/0055818 A1* | 2/2014 | Akaishi | .............. | G06K 15/1878 358/2.1 |
| 2014/0375631 A1* | 12/2014 | Masumoto | .............. | G06T 15/08 345/419 |

FOREIGN PATENT DOCUMENTS

JP    2000-287095 A    10/2000

* cited by examiner

*Primary Examiner* — Marivelisse Santiago Cordero
*Assistant Examiner* — Lennin Rodriguezgonzalez
(74) *Attorney, Agent, or Firm* — Studebaker & Brackett PC

(57) ABSTRACT

An image forming apparatus prints an image using a color conversion table. The image forming apparatus includes a representative color acquisition section and a color adjustment section. The representative color acquisition section acquires at least one representative color of the image. The color adjustment section adjusts a reproduced color, of a color included in the image, obtained with reference to the color conversion table. The color adjustment section adjusts the reproduced color, of the color included in the image, obtained with reference to the color conversion table, based on positional relationship in a color space between a reproduced color of the representative color obtained by a display device and a reproduced color of the representative color obtained with reference to the color conversion table.

5 Claims, 19 Drawing Sheets

| R | G | B | Frequency |
|---|---|---|-----------|
| 0 | 0 | 0 | 0 |
| 0 | 0 | 1 | 0 |
| 0 | 0 | 2 | 0 |
| ... | ... | ... | ... |
| 255 | 255 | 253 | 0 |
| 255 | 255 | 254 | 0 |
| 255 | 255 | 255 | 0 |

FIG. 9

| R | G | B | Frequency |
|---|---|---|---|
| 0 | 0 | 0 | 82 |
| 15 | 201 | 5 | 211 |
| 17 | 19 | 115 | 653 |
| . . . | . . . | . . . | . . . |
| 252 | 136 | 254 | 57 |
| 255 | 242 | 15 | 16 |
| 255 | 255 | 255 | 3 |

FIG. 10

| Area ID | R | G | B | Frequency | |
|---------|-----|-----|-----|-----------|-----|
| 0 | 0 | 0 | 0 | 82 | 82 |
| 1 | 255 | 255 | 255 | 3 | 3 |
| 2 | 18 | 18 | 18 | 103 | 196 |
|   | 21 | 21 | 21 | 42 |  |
|   | 25 | 25 | 25 | 51 |  |
| ... | ... | ... | ... | ... | ... |

FIG. 12

| Area ID | R | G | B | Frequency | |
|---|---|---|---|---|---|
| 46 | 245 | 0 | 1 | 1012 | 3526 |
| | 249 | 1 | 1 | 456 | |
| | 251 | 2 | 0 | 1329 | |
| | 253 | 0 | 0 | 729 | |
| 934 | 5 | 255 | 255 | 1672 | 2725 |
| | 6 | 254 | 253 | 1053 | |
| ⋮ | ⋮ | ⋮ | ⋮ | ⋮ | ⋮ |

FIG. 13

IMAGE FORMING APPARATUS, STORAGE MEDIUM, AND COLOR CONVERSION METHOD

INCORPORATION BY REFERENCE

The present application claims priority under 35 U.S.C. §119 to Japanese Patent Application No. 2015-188074, filed Sep. 25, 2015. The contents of this application are incorporated herein by reference in their entirety.

BACKGROUND

The present disclosure relates to an image forming apparatus, a storage medium, and a color conversion method for converting a color of an image for printing.

A target image to be printed in an image forming apparatus may be printed by the image forming apparatus after user's confirmation as a result of display by a display device. However, there may be a large difference between a region of color reproduction by the display device and a region of color reproduction by the image forming apparatus.

Thus, there is a method for reducing a difference between a reproduced color of an image obtained by the display device and a reproduced color of an image obtained by the image forming apparatus.

SUMMARY

An image forming apparatus of the present disclosure prints an image using a color conversion table. The image forming apparatus includes a representative color acquisition section and a color adjustment section. The representative color acquisition section acquires at least one representative color of the image. The color adjustment section adjusts a reproduced color, of a color included in the image, obtained with reference to the color conversion table. The color adjustment section adjusts the reproduced color, of the color included in the image, obtained with reference to the color conversion table, based on positional relationship in a color space between a reproduced color of the representative color obtained by a display device and a reproduced color of the representative color obtained with reference to the color conversion table.

A non-transitory computer-readable storage medium stores therein a color conversion program to be executed by an image forming apparatus that prints an image using a color conversion table. The color conversion program causes the image forming apparatus to function as a representative color acquisition section acquiring at least one representative color of the image and a color adjustment section adjusting a reproduced color, of a color included in the image, obtained with reference to the color conversion table. The color adjustment section adjusts the reproduced color, of the color included in the image, obtained with reference to color conversion table, based on positional relationship in a color space between a reproduced color of the representative color obtained by a display device and a reproduced color of the representative color obtained with reference to the color conversion table.

A color conversion method is executed in printing an image using a color conversion table by an image forming apparatus. The color conversion method includes: acquiring at least one representative color of the image; and adjusting a reproduced color, of a color included in the image, obtained with reference to the color conversion table. The reproduced color, of the color included in the image, obtained with reference to the color conversion table is adjusted based on positional relationship in a color space between a reproduced color of the representative color obtained by a display device and a reproduced color of the representative color obtained with reference to the color conversion table.

BRIEF DESCRIPTION OF THE DRAWINGS

FIG. 9 is a diagram illustrating one example of a data string generated in the representative color acquisition processing illustrated in FIGS. 8A and 8B.

FIG. 10 is a diagram illustrating one example of the data string generated in the representative color acquisition processing illustrated in FIGS. 8A and 8B and also an example different from the example illustrated in FIG. 9.

FIG. 12 is a diagram illustrating one example of the data string generated in the representative color acquisition processing illustrated in FIGS. 8A and 8B and also an example different from the examples illustrated in FIGS. 9 and 10.

FIG. 13 is a diagram illustrating one example of the data string generated in the representative color acquisition processing illustrated in FIGS. 8A and 8B and also an example different from the examples illustrated in FIGS. 9, 10, and 12.

DETAILED DESCRIPTION

Hereinafter, one embodiment of the present disclosure will be described with reference to the drawings.

First, configuration of an image forming system including a multifunction peripheral (MFP) as an image forming apparatus according to the present embodiment will be described.

Figure 1:
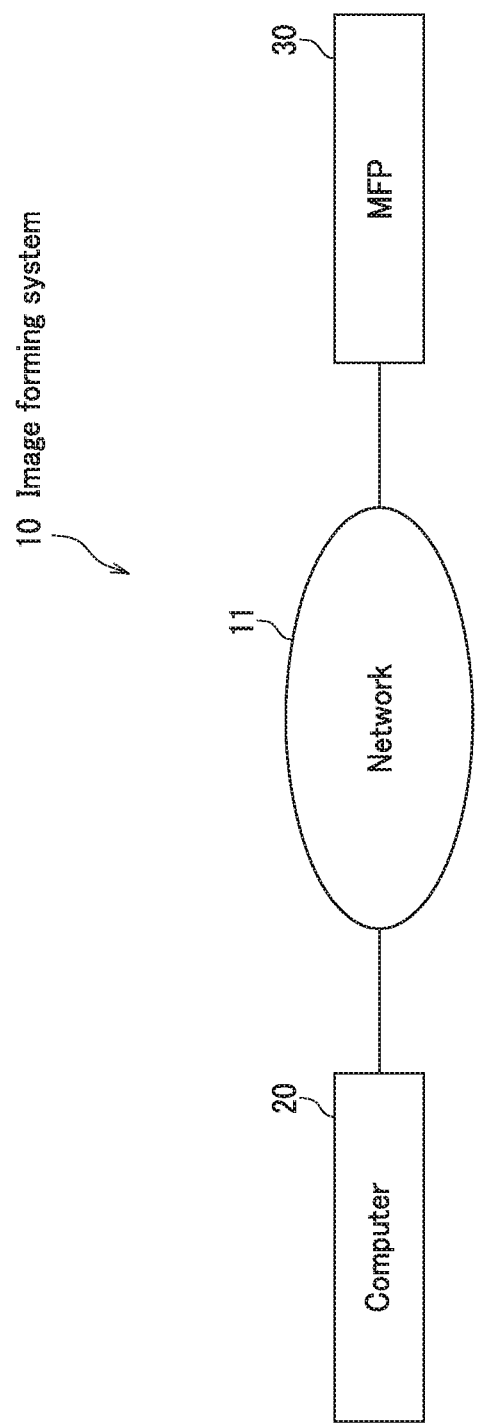
FIG. 1 is a block diagram of an image forming system according to one embodiment of the present disclosure.

FIG. 1 is a block diagram of the image forming system 10 according to the present embodiment.

As illustrated in FIG. 1, the image forming system 10 includes a computer 20 and an MFP 30. The computer 20 is, for example, a personal computer (PC) that transmits print data of an image. The MFP 30 prints the image based on the print data transmitted by the computer 20. The computer 20 and the MFP 30 are communicable with each other via a network 11 such as the Internet or a local area network (LAN).

Figure 2:
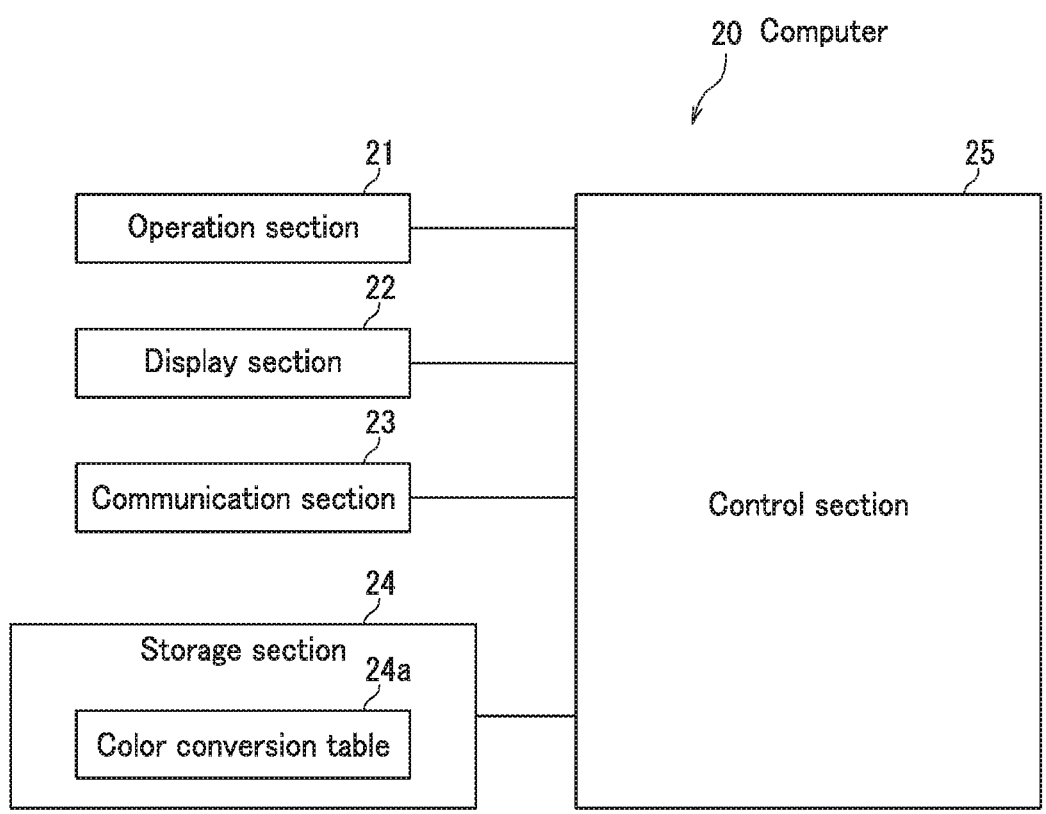
FIG. 2 is a block diagram of a computer illustrated in FIG. 1.

FIG. 2 is a block diagram of the computer 20.

As illustrated in FIG. 2, the computer 20 includes an operation section 21, a display section 22, a communication section 23, a storage section 24, and a control section 25. The operation section 21 is an input device such as a mouse and a keyboard via which various operations are inputted, and the display section 22 is a display device such as a liquid crystal display (LCD) that displays various pieces of information. The communication section 23 is a communication device that makes communication with an external device via the network 11 (see FIG. 1). The storage section 24 is a storage device such as a hard disk drive (HDD) that stores various pieces of data. The control section 25 controls the entire computer 20.

The storage section 24 stores a color conversion table 24a provided for displaying an image by the display section 22. The color conversion table 24a is a lookup table for "RGB|Lab (Lch|CMYK". That is, the color conversion table 24a is a color table indicating correspondence between RGB values, Lab values (Lch values), and CMYK values. The RGB values, the Lab values (Lch values), and the CMYK values included in the color conversion table 24a are designed values.

The control section 25 includes: for example, a central processing unit (CPU); a read only memory (ROM) that stores programs and various pieces of data; and a random access memory (RAM) that is used as a working region of the CPU. The CPU executes programs stored in the ROM or the storage section 24.

Figure 3:
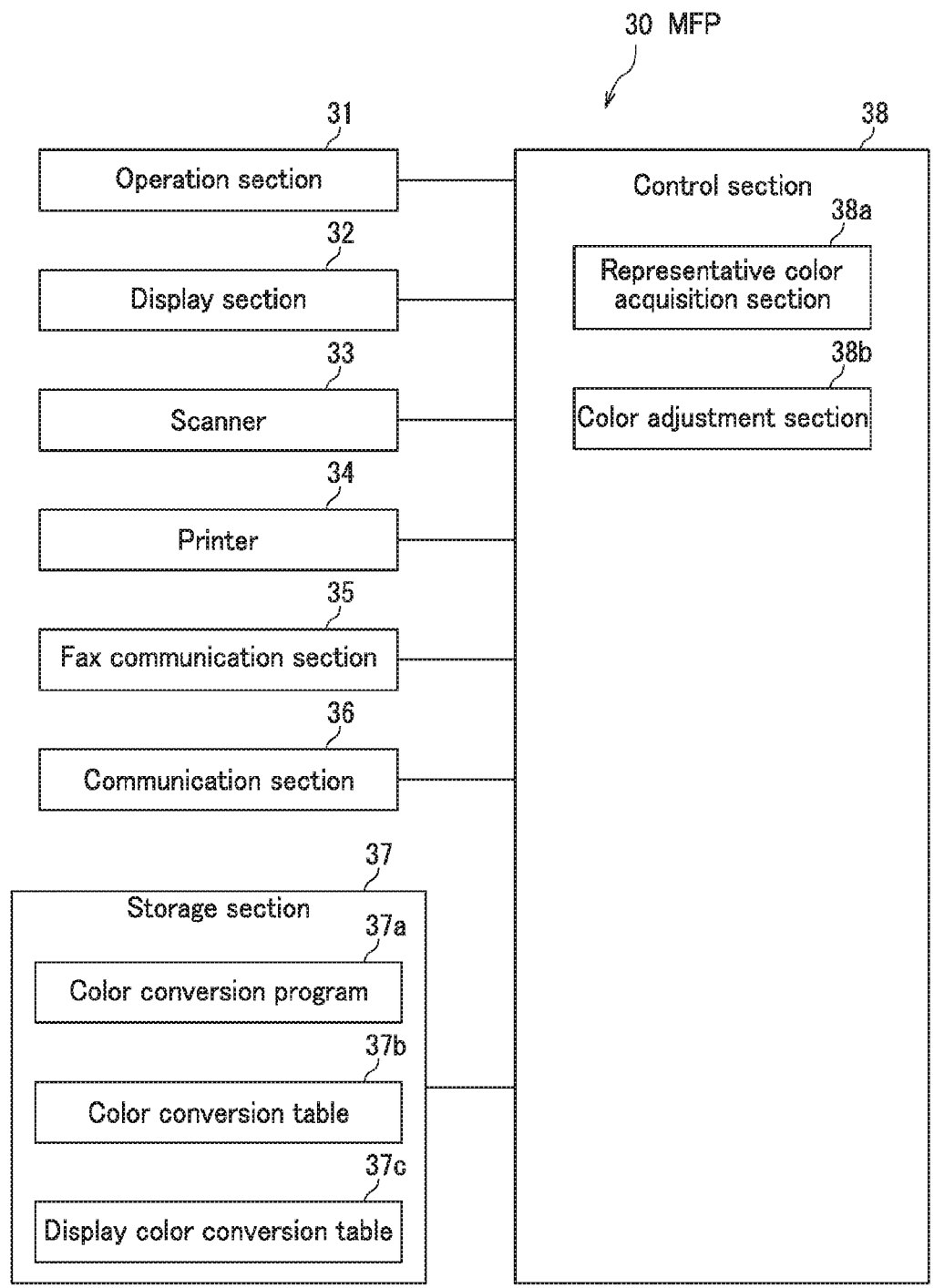
FIG. 3 is a block diagram of an MFP illustrated in FIG. 1.

FIG. 3 is a block diagram of the MFP 30.

As illustrated in FIG. 3, the MFP 30 includes an operation section 31, a display section 32, a scanner 33, a printer 34, a fax communication section 35, a communication section 36, a storage section 37, and a control section 38. The operation section 31 is an input device such as buttons via which various operations are inputted. The display section 32 is a display device such as the LCD that displays various pieces of information. The scanner 33 is a reading device that reads an image. The printer 34 is a printing device that executes printing on a storage medium such as paper. The fax communication section 35 is a fax device that makes fax communication with an external facsimile device, not illustrated, via a communication line such as a public phone line. The communication section 36 is a communication device that makes communication with an external device via the network 11 (see FIG. 1). The storage section 37 is a storage device such as a semiconductor memory and the HDD that stores various pieces of data. The control section 38 controls the entire MFP 30.

The storage section 37 stores a color conversion program 37a for converting a color of an image for printing. The color conversion program 37a may be installed in the MFP 30 at a stage of producing the MFP 30, may additionally be installed in the MFP 30 from an external storage medium such as a universal serial bus (USB) memory, or may additionally be installed in the MFP 30 from the network 11.

The storage section 37 stores a color conversion table 37b for printing an image by the printer 34. The color conversion table 37b is a lookup table for "RGB|Lab(Lch|CMYK". That is, the color conversion table 37b is a color table indicating correspondence between RGB values, Lab values (Lch values), and CMYK values. The RGB values, the Lab values (Lch values), and the CMYK values included in the color conversion table 37b are designed values.

The storage section 37 stores a display color conversion table 37c as a color conversion table identical to the color conversion table 24a (see FIG. 2) of the computer 20 (see FIG. 2).

The control section 38 includes: for example, a CPU; a ROM that stores programs and various pieces of data; and a RAM that is used as a working region of the CPU. The CPU executes programs stored in the ROM or the storage section 37.

The control section 38 functions as a representative color acquisition section 38a and a color adjustment section 38b as a result of executing the color conversion program 37a stored in the storage section 37. The representative color acquisition section 38a acquires at least one representative color of an image. The color adjustment section 38b adjusts a reproduced color, of a color included in an image, obtained with reference to the color conversion table 37b.

Next, the region of color reproduction by the display section 22 of the computer 20 and the region of color reproduction by the printer 34 of the MFP 30 will be described.

FIGS. 4A to 4F are diagrams illustrating a difference on a representative hue plane between the region of color reproduction by the display section 22 of the computer 20 and the region of color reproduction by the printer 34 of the MFP 30.

A range of intensity in the region of color reproduction by the display section 22 of the computer 20 is wider than a range of intensity in the region of color reproduction by the printer 34 of the MFP 30. Therefore, for comparison between the region of color reproduced by the display section 22 of the computer 20 and the region of color reproduction by the printer 34 of the MFP 30, the range of intensity in the region of color reproduction by the display section 22 of the computer 20 is corrected in FIGS. 4A to 4F. More specifically, correction is performed in a manner such as to achieve agreement between the range of intensity in the region of color reproduction by the display section 22 of the computer 20 and the range of intensity in the region of color reproduction by the printer 34 of the MFP 30.

In FIGS. 4A to 4F, the region of color reproduction by the display section 22 of the computer 20 is illustrated by a broken line. In FIGS. 4A to 4F, the region of color reproduction by the printer 34 of the MFP 30 is illustrated by a solid line.

Figure 4A:
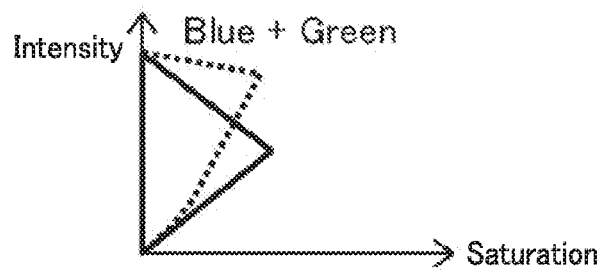
FIGS. 4A to 4F are diagrams illustrating a difference on a representative hue plane between a region of color reproduction by a display section of the computer illustrated in FIG. 2 and a region of color reproduction by a printer of the MFP illustrated in FIG. 3.
Figure 4B:
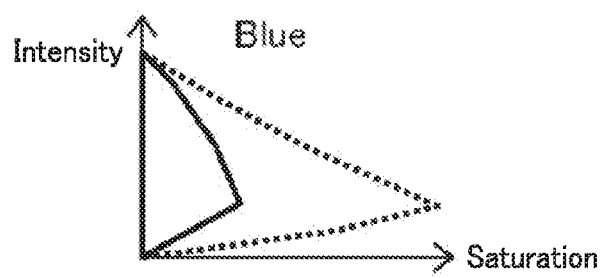
Figure 4C:
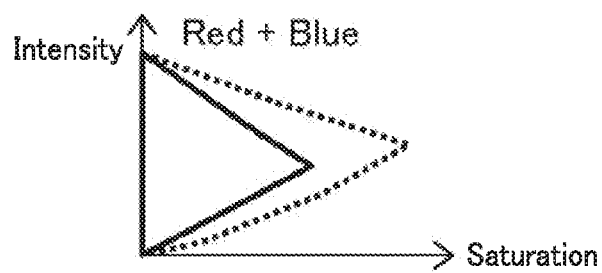
Figure 4D:
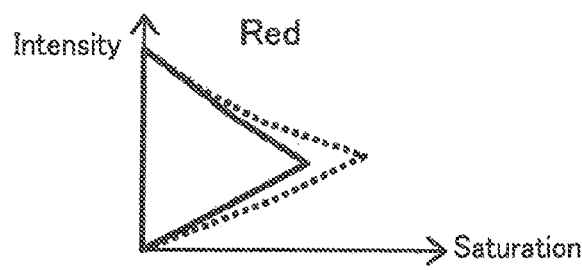
Figure 4E:
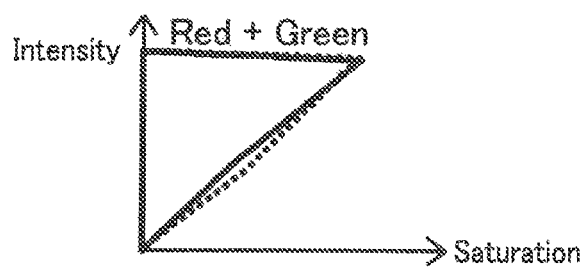
Figure 4F:
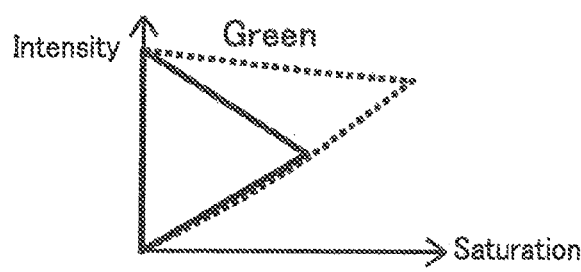

As illustrated in FIGS. 4D and 4F, there is no large difference on a "Red" hue plane and a "Red+Green" hue plane between the region of color reproduction by the display section 22 of the computer 20 and the region of color reproduction by the printer 34 of the MFP 30.

On the other hand, as illustrated in FIGS. 4A and 4B, there is a large difference on, for example, a "Blue" hue plane and a "Blue+Green" hue plane between the region of color reproduction by the display section 22 of the computer 20 and the region of color reproduction by the printer 34 of the MFP 30. That is, little color is generated by the display section 22 of the computer 20 in the region of color reproduction by the printer 34 of the MFP 30.

Figure 5:
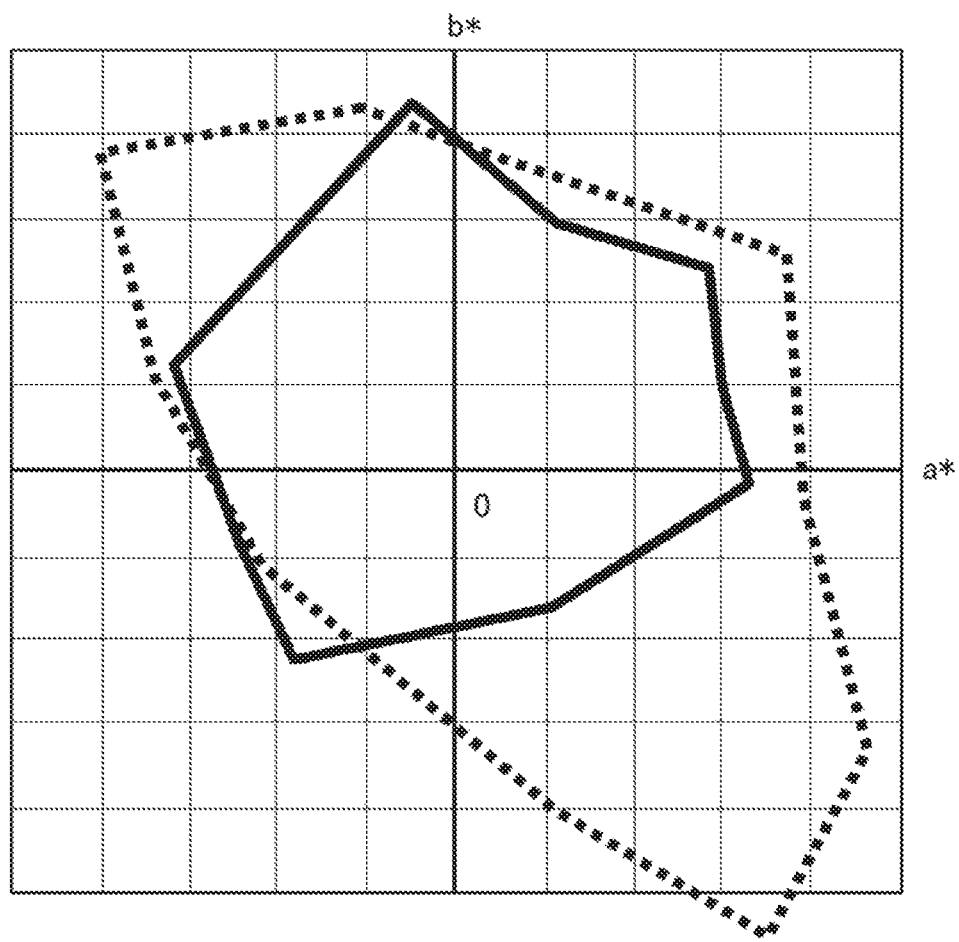
FIG. 5 is a diagram illustrating a difference on an a*b* plane in a LAB space between the region of color reproduction by the display section of the computer illustrated in FIG. 2 and the region of color reproduction by the printer of the MFP illustrated in FIG. 3.

FIG. 5 is a diagram illustrating a difference on an a*b* plane in a LAB space between the region of color reproduction by the display section 22 of the computer 20 and the region of color reproduction by the printer 34 of the MFP 30.

In FIG. 5, as in FIGS. 4A to 4F, correction is performed in a manner such as to achieve agreement between the range of intensity in the region of color reproduction by the display section 22 of the computer 20 and the range of intensity in the region of color reproduction by the printer 34 of the MFP 30. In FIG. 5, the region of color reproduction by the display section 22 of the computer 20 is illustrated by a broken line. In FIG. 5, the region of color reproduction by the printer 34 of the MFP 30 is illustrated by a solid line.

As illustrated in FIG. 5, the region of color reproduction by the display section 22 of the computer 20 is larger than the region of color reproduction by the printer 34 of the MFP 30.

Figure 6:
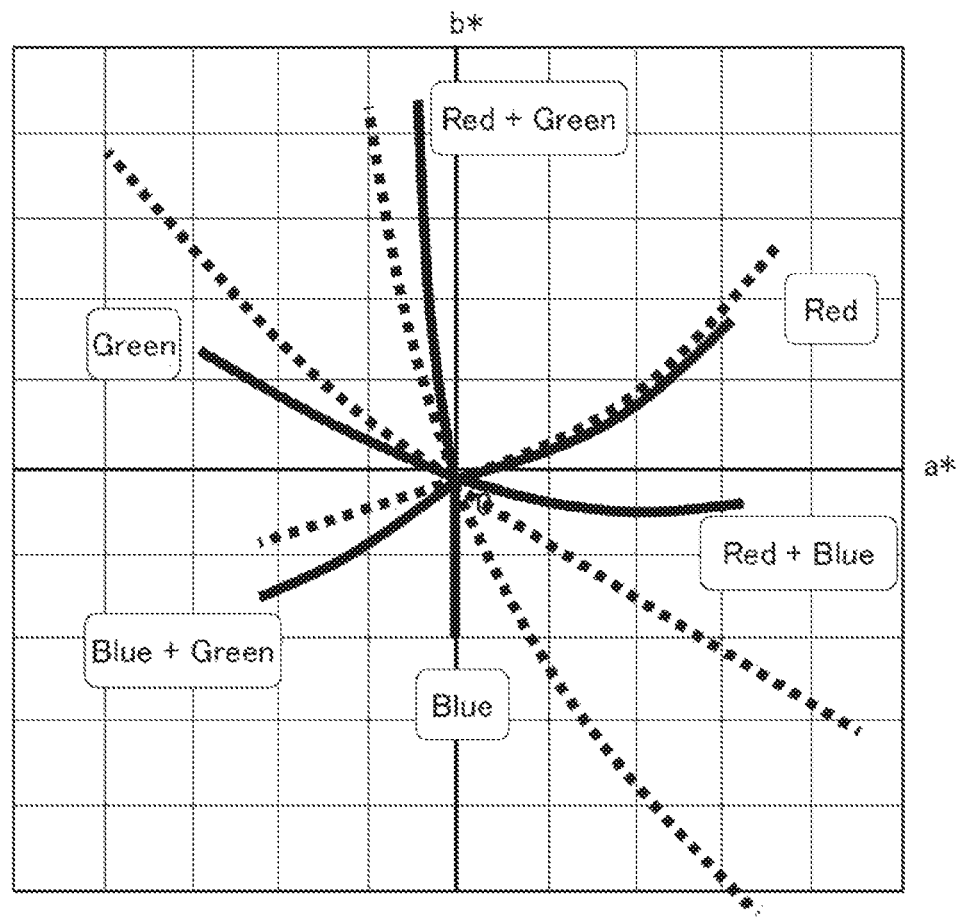
FIG. 6 is a diagram illustrating a difference on the a*b* plane in the LAB space on the representative hue plane between the region of color reproduction by the display section of the computer illustrated in FIG. 2 and the region of color reproduction by the printer of the MFP illustrated in FIG. 3.

FIG. 6 is a diagram illustrating a difference on the a*b* plane in the LAB space on a representative hue plane between the region of color reproduction by the display section 22 of the computer 20 and the region of color reproduction by the printer 34 of the MFP 30.

In FIG. 6, as in FIGS. 4A to 4E, correction is performed to achieve agreement between the range of intensity in the region of color reproduction by the display section 22 of the computer 20 and the range of intensity in the region of color reproduction by the printer 34 of the MFP 30. In FIG. 6, the region of color reproduction by the display section 22 of the computer 20 is illustrated by broken lines. In FIG. 6, the region of color reproduction by the printer 34 of the MFP 30 is illustrated by solid lines.

As illustrated in FIG. 6, it is difficult for the printer 34 of the MFP 30 to reproduce a tint around "Blue" provided by the display section 22 of the computer 20.

Next, operation of the MFP 30 will be described.

Figure 7:
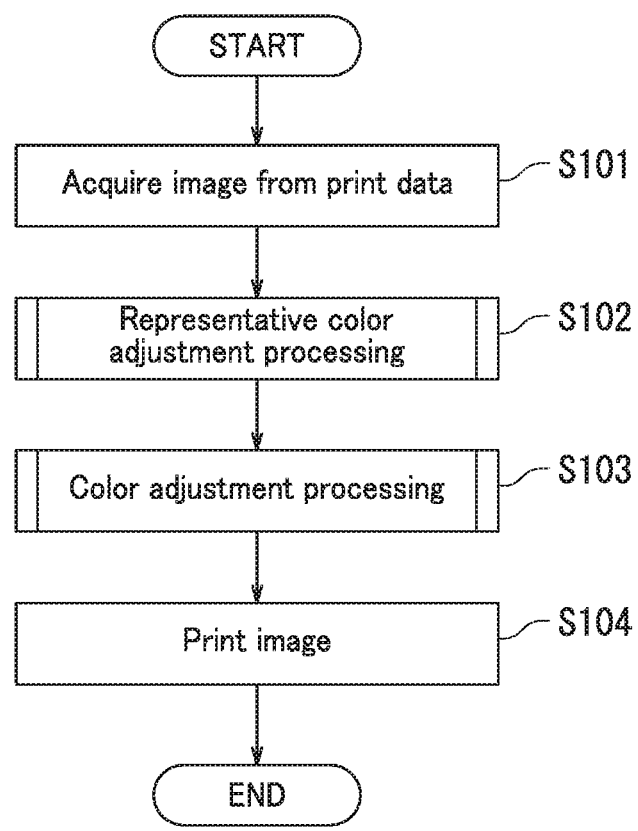
FIG. 7 is a flowchart of operation performed by the MFP illustrated in FIG. 3 to print an image.

FIG. 7 is a flowchart of the operation performed by the MFP 30 to print an image.

As illustrated in FIG. 7, the control section 38 acquires an image from print data received via the communication section 36 (S101). A color of each pixel included in the image acquired (hereinafter referred to as "target image") in S101 is denoted by an RGB value.

After processing of S101, the representative color acquisition section 38a of the control section 38 executes representative color acquisition processing for acquiring five representative colors of the target image (S102).

Figure 8A:
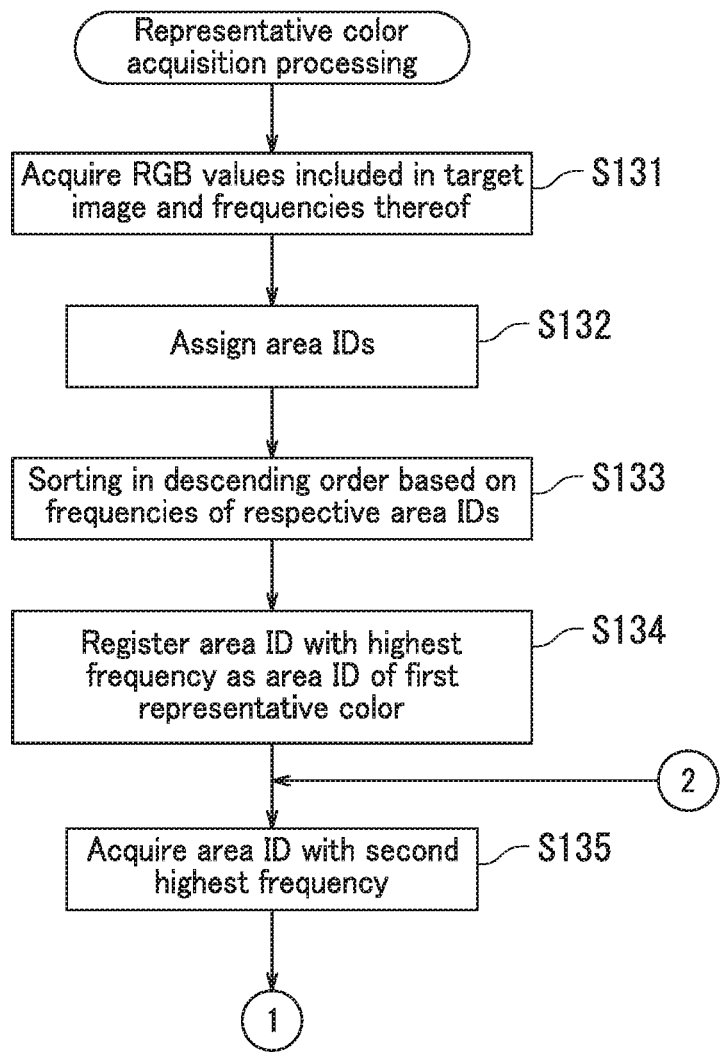
FIG. 8A is a former stage of a flowchart of representative color acquisition processing illustrated in FIG. 7.
Figure 8B:
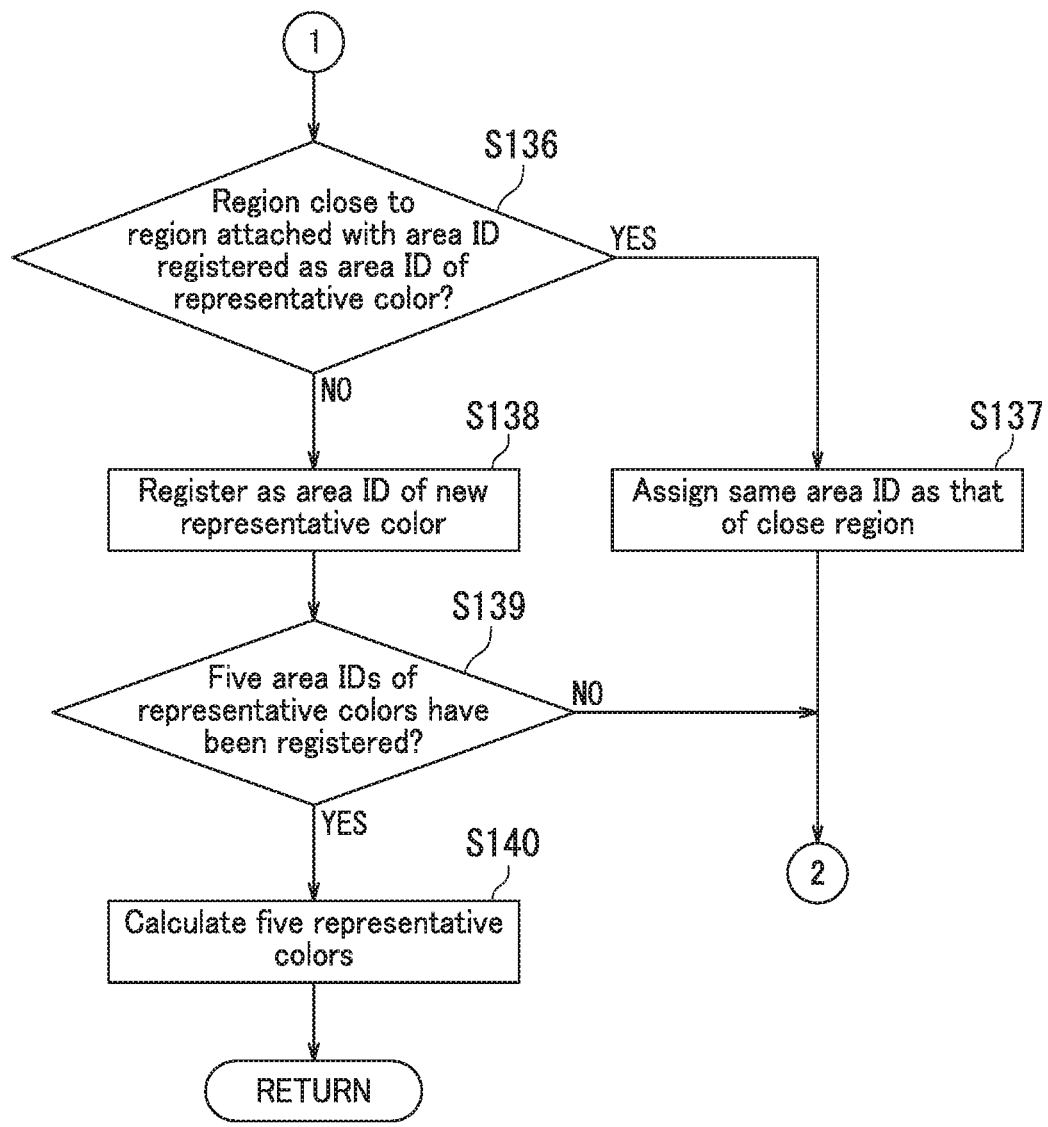
FIG. 8B is a later stage of the flowchart of representative color acquisition processing illustrated in FIG. 7.

FIG. 8A is a former stage of a flowchart of the representative acquisition processing illustrated in FIG. 7. FIG. 8B is a later stage of the flowchart of the representative acquisition processing illustrated in FIG. 7.

As illustrated in FIG. 8A, the representative color acquisition section 38a acquires RGB values included in the target image and respective frequencies of the RGB values included in the target image (S131).

More specifically, the representative color acquisition section 38a first generates a data string including all RGB values that can be included in the target image and respective frequencies of the aforementioned RGB values included therein, as illustrated in FIG. 9. FIG. 9 is a diagram illustrating one example of the data string generated in the representative color acquisition processing illustrated in FIGS. 8A and 8B. Here, there are a cube of 256 patterns in a case where respective R values, G values, and B values of all the RGB values that can be included in the target image are each expressed in eight bits. The frequencies included in the data string are all 0 when the data string has been generated.

Next, the representative color acquisition section 38a sequentially executes, on each of all pixels included in the target image, processing for "incrementing, by 1, the frequency of the RGB value of the target pixel in the data string, targeted on one pixel included in the target image. By the aforementioned processing, the data string does not include any information other than the RGB value of each pixel, and thus can suppress a data volume. The information other than the RGB value of each pixel include, for example, coordinates of each pixel in the target image.

Finally, the representative color acquisition section 38a deletes any RGB value with a frequency of 0 and the frequency of the aforementioned RGB value from the data string to thereby generate a data string of RGB values and frequencies thereof related to the target image. The generated data string is, for example, a data string as illustrated in FIG. 10. FIG. 10 is a diagram illustrating one example of the data string generated in the representative color acquisition processing illustrated in FIGS. 8A and 8B and an example different form the example of FIG. 9.

After processing of S131, the representative color acquisition section 38a assigns the RGB values included in the data string generated in S131 with respective area IDs (S132).

Figure 11:
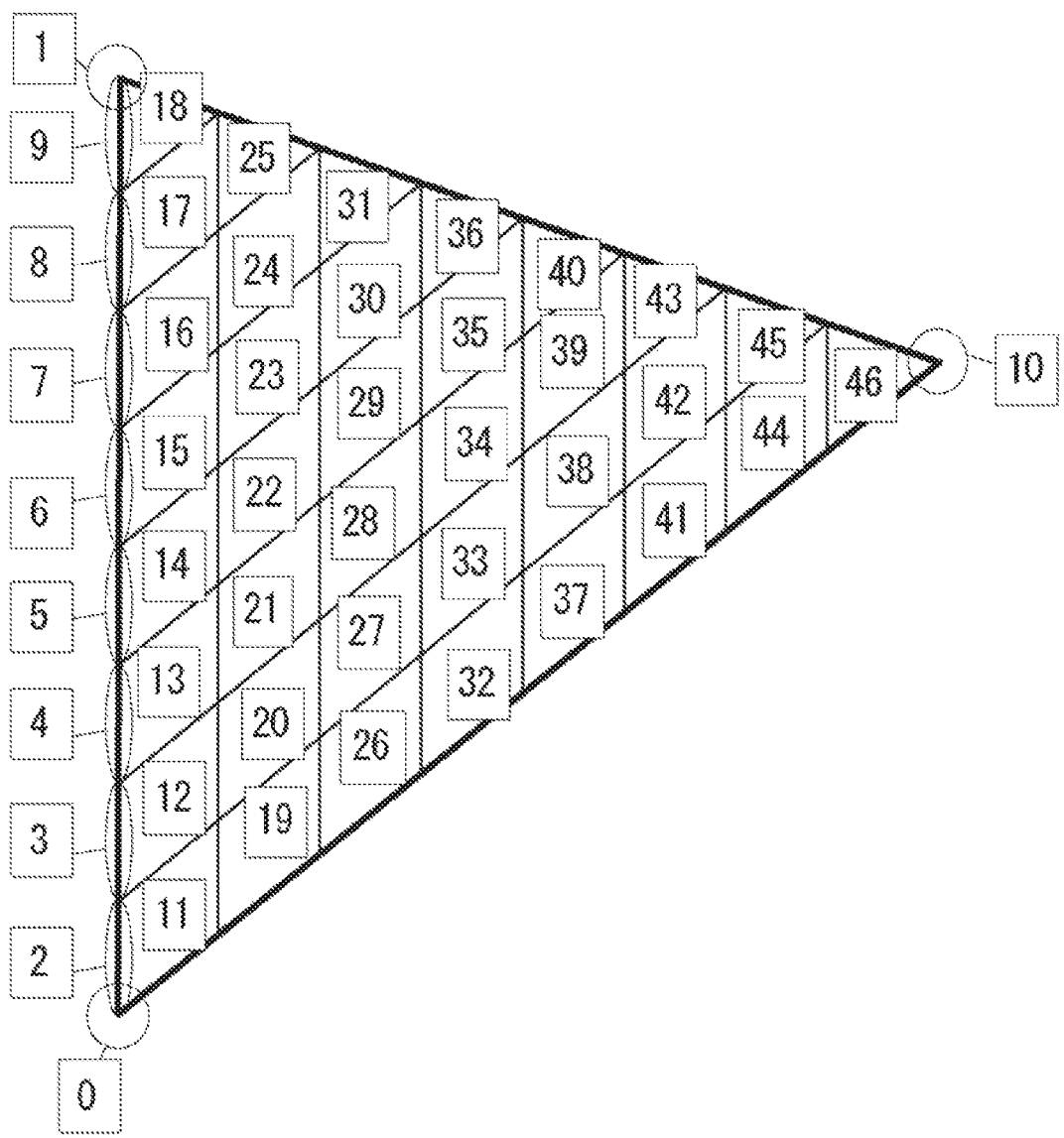
FIG. 11 is a diagram illustrating one example of a color space divided into a plurality of regions in the representative color acquisition processing illustrated in FIGS. 8A and 8B.

Here, the area ID is a color space of the target image, that is, identification information attached to an individual region of a plurality of regions obtained by dividing an RGB color space. For example, the RGB color space is equally divided into 48 angle ranges based on hues, and each angle range is divided into a plurality of regions as illustrated in FIG. 11. FIG. 11 is a diagram illustrating one example of the color space divided into the plurality of regions in the representative color acquisition processing illustrated in FIGS. 8A and 8B. Note that an intensity axis where the saturation is 0 is common to the angle ranges of the hues and thus is controlled separately from the angle ranges of the hues. Therefore, as illustrated in FIG. 11, the area ID of black ((R,G,B)=(0,0,0)) is 0, the area ID of white ((R,G,B)=(255, 255,255)) is 1, and area IDs of the eight regions on the intensity axis are 2 to 9, respectively. That is, there are 10 types of area IDs on the intensity axis. Then the area ID of the color with the peak saturation in the specific angle range of the hues is 10, and the area IDs of the other regions are 11 to 46, respectively. That is, there are 37 types of area IDs in each angle range of the hues. Thus, the RGB color space is divided into 1786(=10+37×48) regions to which mutually different area IDs are respectively attached.

First, for the RGB value included in the data string generated in S131, the representative color acquisition section 38a assigns the area ID attached to the region where the aforementioned RGB value is included.

Next, the representative color acquisition section 38a collects the frequencies of the respective assigned area IDs to generate a data string as illustrated in FIG. 12. FIG. 12 is a diagram illustrating one example of the data string generated in the representative color acquisition processing illustrated in FIGS. 8A and 8B and an example different form the examples of FIGS. 9 and 10.

After processing of S132, the representative color acquisition section 38a sorts the data string generated in S132 in descending order based on the frequencies of the respective area IDs (S133). That is, the representative color acquisition section 38a generates a data string as illustrated in FIG. 13. FIG. 13 is a diagram illustrating one example of the data string generated in the representative color acquisition processing illustrated in FIGS. 8A and 8B and an example different from the examples of FIGS. 9, 10, and 12.

After processing of S133, the representative color acquisition section 38a registers, as an area ID of the first representative color, the first area ID of the data string sorted in S133, that is, the area ID with the highest frequency as (S134).

Next, the representative color acquisition section 38a acquires, from among all the area IDs already targeted on in the data string stored in S133, the area ID with the second highest frequency (S135). That is, the representative color acquisition section 38a acquires, from among all the area IDs targeted in processing of S134 or all processing of S135 performed up to previous time, the area ID with the second highest frequency. More specifically, in the first processing of S135, the representative color acquisition section 38a acquires the area ID with the highest frequency next to the area ID targeted for the registration in the processing of S134. In the second processing of S135 beyond, the representative color acquisition section 38a acquires the area ID with the highest area ID next to all the area IDs targeted for the registration in all the processing of S135 performed up to previous time.

After the processing of S135, the representative color acquisition section 38a determines whether or not the region which is acquired in S135 this time and the region to which the area ID already registered as the area ID of the representative color is attached are close to each other (S136). A determination criterion for the determination that the aforementioned regions are close to each other depend on design. For example, in a case where the region attached with the area ID acquired in S135 and the region attached with the area ID registered as the area ID of the representative color are adjacent to each other, the representative color acquisition section 38a determines that the aforementioned regions are close to each other.

When it is determined by the representative color acquisition section 38a in S136 that the regions are close to each other, the representative color acquisition section 38a assigns the area ID attached to the region determined to be a close region in S136 to the region attached with the area ID acquired in S135 this time (S137), and executes the processing of S135.

When it is determined in S136 that the regions are not close to each other, the representative color acquisition section 38a resisters, for the region attached with the area ID acquired in S135, the area ID of a new representative color (S138).

Next, the representative color acquisition section 38a determines whether or not five area IDs of the representative colors have been registered (S139).

When it is determined by the representative color acquisition section 38a in S139 that the five area IDs of the representative colors have not yet been registered, the representative color acquisition section 38a executes the processing of S135.

When it is determined by the representative color acquisition section 38a in S139 that the five area IDs of the representative colors have been registered, the representative color acquisition section 38a calculates the representative color for each of the area IDs of the representative colors, based on the RGB value attached with the area ID registered as the area ID of the representative color and based on a frequency value thereof.

For example, in FIG. 13, in a case where the area ID "46" is an area ID of the representative colors and there are only four RGB values (245,0,1), (249,1,1), (251,2,0), and (253,0,0) assigned with the area ID "46", the representative color of the region assigned with the area ID "46" is obtained by (245,0,1)×1012/3526+(249,1,1)×456/3526+(251,2,0)×1329/3526+(253,0,0)×729/3526=(249,1,0). That is, the representative color acquisition section 38a acquires the representative colors by way of averaging by multiplying the RGB values attached with the area IDs registered as the area IDs of the representative colors by the respective frequency valued thereof.

The representative color acquisition section 38a ends the representative color acquisition processing illustrated in FIG. 8 after processing of S140.

As illustrated in FIG. 7, after the representative color acquisition processing of S102, the color adjustment section 38b of the control section 38 executes color adjustment processing for adjusting a reproduced color, of a color included in the target image, obtained with reference to the color conversion table 37b (S103).

Figure 14A:
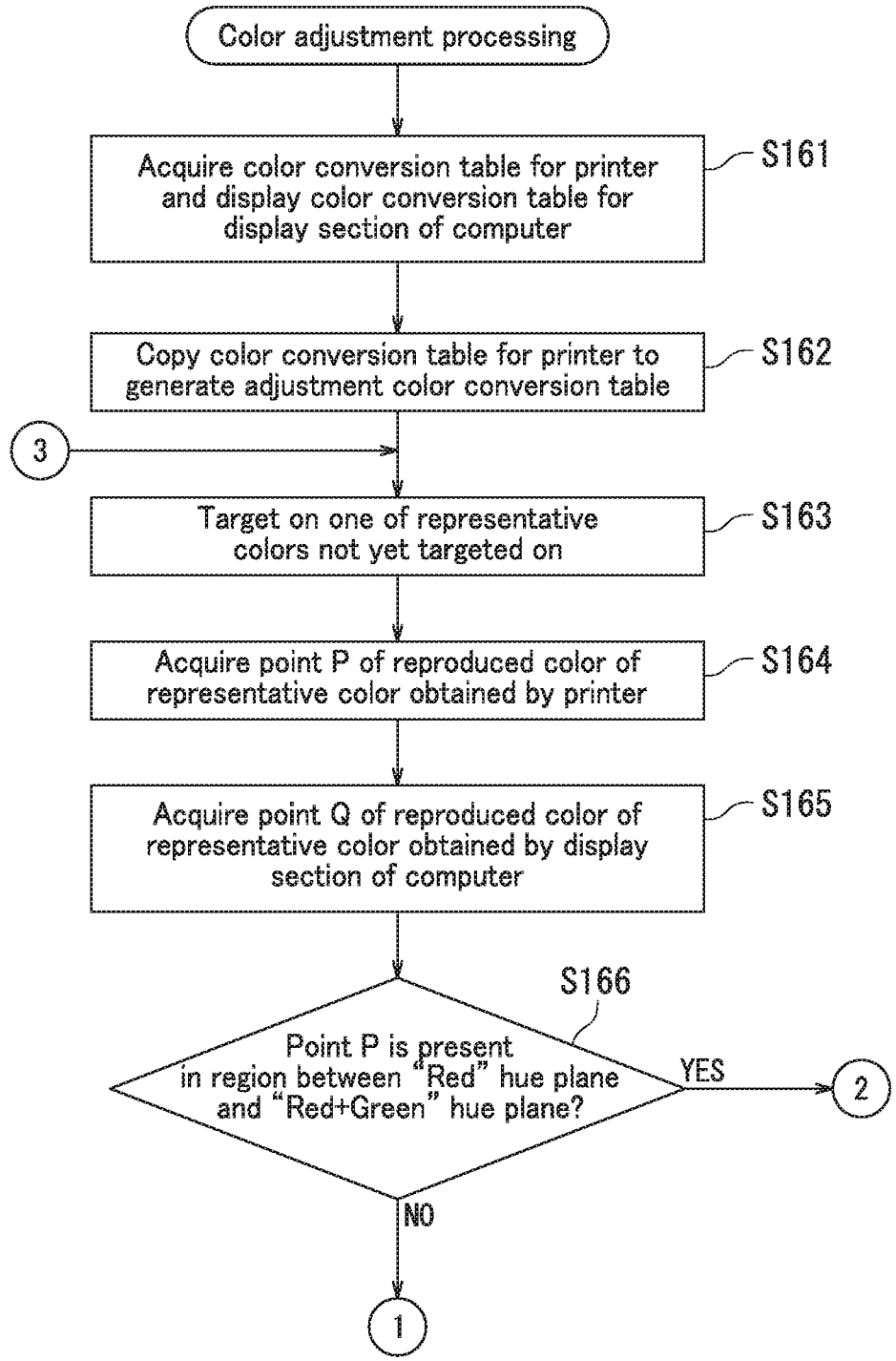
FIG. 14A is a former stage of a flowchart of color adjustment processing illustrated in 7.
Figure 14B:
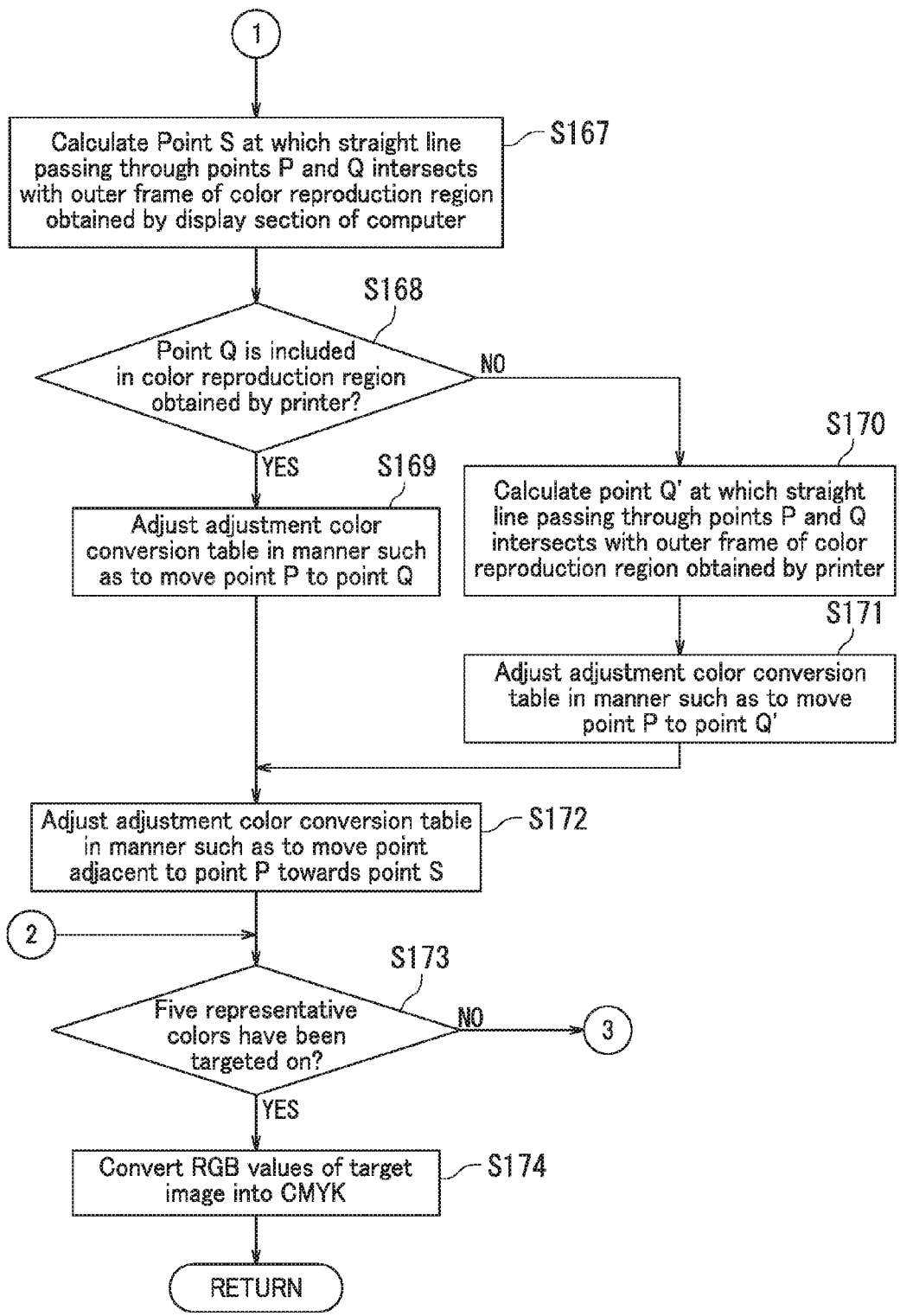
FIG. 14B is a later stage of the flowchart of the color adjustment processing illustrated in FIG. 7.

FIG. 14A is a former stage of the flowchart of the color adjustment processing illustrated in FIG. 7. FIG. 14B is a later stage of the flowchart of the color adjustment processing illustrated in FIG. 7.

As illustrated in FIG. 14, the color adjustment section 38b acquires, from the storage section 37, the color conversion table 37b for printing an image by the printer 34 and the display color conversion table 37c for displaying an image by the display section 22 of the computer 20 (S161).

Next, the color adjustment section 38b copies the color conversion table 37b acquired in S161 to generate an adjustment color conversion table (S162).

Next, the color adjustment section 38b targets on one of the five representative colors calculated in S140 but not yet targeted on (S163).

Next, the color adjustment section 38b acquires a point P of the reproduced color, of the representative color (a RGB value) in the LAB color space, obtained with reference to the color conversion table 37b (S164). For an RGB value not included in the color conversion table 37b, the color adjustment section 38b converts the RGB value into Lab value (Lch value) through interpolation calculation based on the RGB value included in the color conversion table 37b and the Lab value (Lch value) corresponding to the aforementioned RGB value in the color conversion table 37b.

After processing of S164, the color adjustment section 38b acquires a point Q of a reproduced color, of the target representative color (RGB value) in the LAB space, obtained with reference to the display color conversion table 37c (S165). For an RGB value not included in the display color conversion table 37c, the color adjustment section 38b converts the RGB value into Lab value (Lch value) through interpolation calculation based on the RGB value included in the display color conversion table 37c and the Lab value (Lch value) corresponding to the aforementioned RGB value in the color conversion table 37b.

Figure 15:
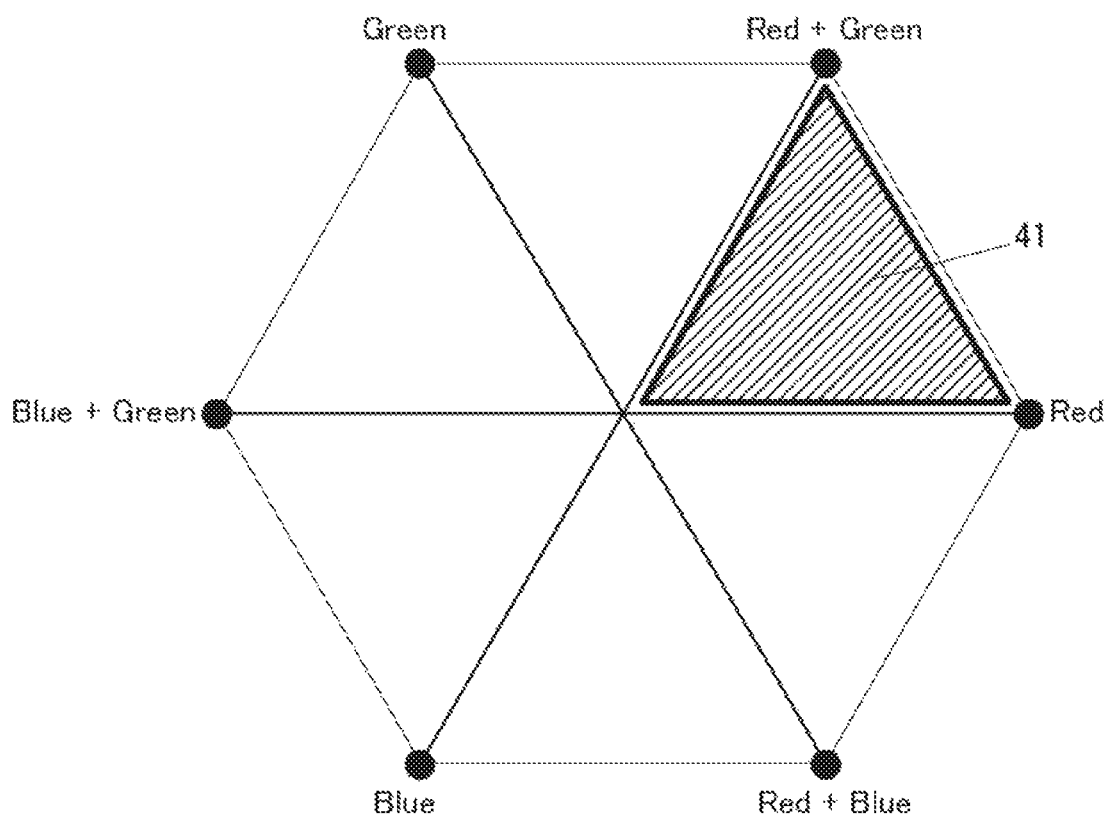
FIG. 15 is a diagram illustrating a region where no color adjustment is performed in the color adjustment processing illustrated in FIGS. 14A and 14B.

FIG. 15 is a diagram illustrating a region where the color adjustment is not performed in the color adjustment processing illustrated in FIGS. 14A and 14B. After processing of S165, the color adjustment section 38b determines whether or not the point P acquired in S164 is located in a region 41 illustrated in FIG. 15 and sandwiched between the "Red" hue plane and the "Red+Green" hue plane (S166). Here, as described above, there is no large difference on the "Red" hue plane and the "Red+Green" hue plane between the region of color reproduction by the display section 22 of the computer 20 and the region of color reproduction by the printer 34 of the MFP 30. Thus, there is little need of adjusting the point P present in the region 41. Therefore, the color adjustment section 38b determines in S166 whether or not the point P is present in the region 41.

Figure 16:
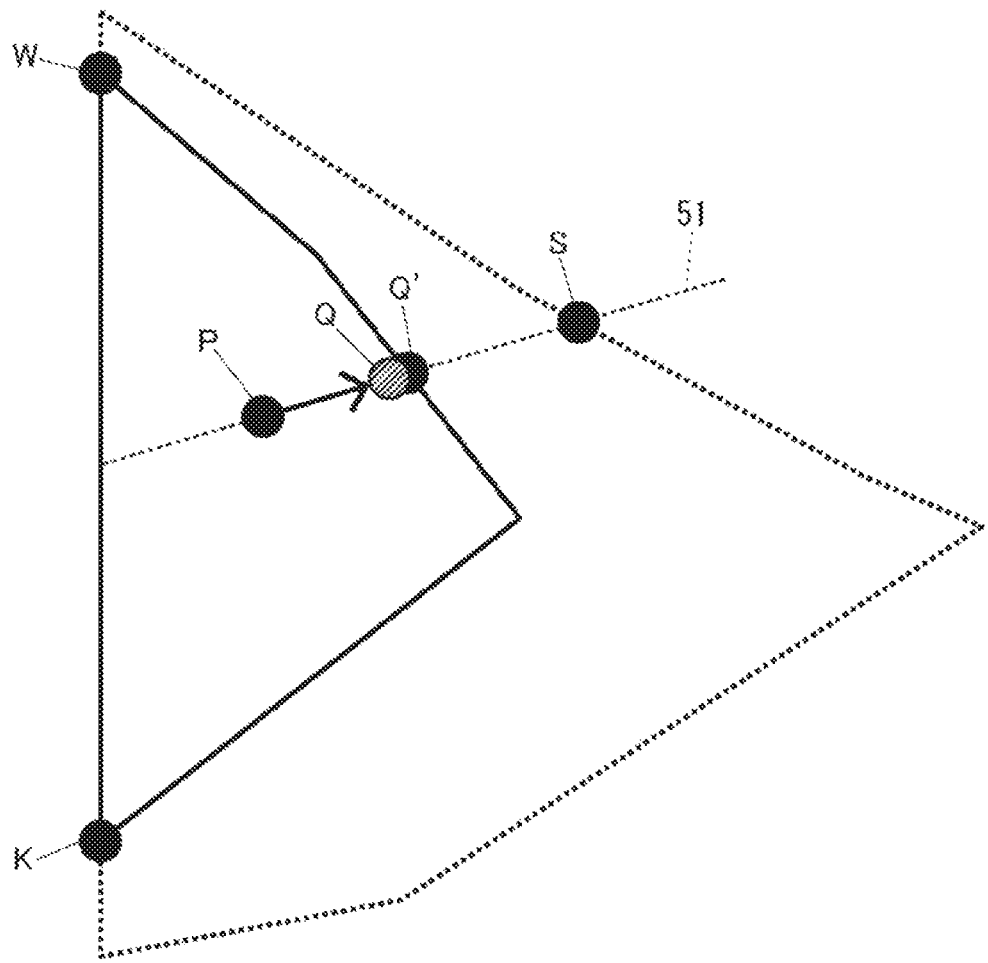
FIG. 16 is a diagram illustrating a color adjustment method performed in the color adjustment processing illustrated in FIGS. 14Aa and 14B.

FIG. 16 is a diagram illustrating a color adjustment method performed in the color adjustment processing illustrated in FIGS. 14A and 14B. When it is determined by the color adjustment section 38b in S166 that the point P is not present in the region 41, on the hue plane where the point P acquired in S164 is present, the color adjustment section 38b calculates a point S at which a straight line 51 passing through the point P and the point Q acquired in S165 intersects with an outer frame of the region of color reproduction with reference to the display color conversion table 37c, that is, the region of color reproduction by the display section 22 of the computer 20, as illustrated in FIG. 16 (S167).

In FIG. 16, the region of color reproduction by the display section 22 of the computer 20 is illustrated by a broken line. The region of color reproduction by the printer 34 is illustrated by a solid line. Points K and W are a black point and a white point, respectively, in the region of color reproduction by the printer 34.

Note that in processing of S167 to 170, in a case where the point Q is not present on the hue plane where the point P is present, a point which is present on the hue plane where the point P is present and which has the same intensity and saturation as those of the point Q is used in place of the point Q.

After the processing of S167, the color adjustment section 38b determines whether or not the point Q is included in the region of color reproduction by the printer 34 (S168).

When it is determined by the color adjustment section 38b in S168 that the point Q is included in the region of color reproduction by the printer 34, the color adjustment section 38b adjusts the adjustment color conversion table in a manner such as to move the point P to the point Q (S169).

When it is determined by the color adjustment section 38b in S168 that the point Q is not included in the region of color reproduction by the printer 34, the color adjustment section 38b calculates a point Q' where the straight line 51 passing through the point P and the point Q intersects with the outer frame of the region of color reproduction by the printer 34 (S170).

Next, the color adjustment section 38b adjusts the adjustment color conversion table in a manner such as to move the point P to the point Q' (S171).

After processing of S169 or S171, the color adjustment section 38b adjusts the adjustment color conversion table in a manner such as to move a point near the point P towards the point S (S172). Here, the color adjustment section 38b sets an amount of movement of the point near the point P smaller with an increase in a distance of the aforementioned point from the point P on the hue where the amount of movement of the point P is provided as an upper limit. Similarly, the color adjustment section 38b sets the amount of movement of the point near the point P smaller with an increase in a distance of the aforementioned point from the point P in intensity where the amount of movement of the point P is provided as an upper limit. Similarly, the color adjustment section 38b sets the amount of movement of the point near the point P smaller with an increase in a distance of the aforementioned point from the point P in saturation where the amount of movement of the point P is provided as an upper limit.

When it is determined in S166 that the point P is present in the region 41 or when processing of S172 ends, the color adjustment section 38b determines whether or not all the five representative colors calculated in S140 have been targeted on (S173).

When it is determined by the color adjustment section 38b in S173 that any of the five representative colors has not yet been targeted on, the color adjustment section 38b executes the processing of S163.

When it is determined by the color adjustment section 38b in S173 that all the five representative colors have been targeted on, the color adjustment section 38b converts the RGB value of the pixel of the target image into Lab value (Lch value) with reference to the adjustment color conversion table and then converts the obtained Lab value (Lch value) into a CMYK value with reference to the color conversion table 37b, thereby generating an image of the CMYK values (S174). Note that for an RGB value not included in the adjustment color conversion table, the color adjustment section 38b converts the RGB value into Lab value (Lch value) by interpolation calculation based on the RGB value included in the adjustment color conversion table and the Lab value (Lch value) corresponding to the aforementioned RGB value in the adjustment color conversion table. Similarly, for a Lab value (Lch value) not included in the color conversion table 37b, the color adjustment section 38b converts the Lab value (Lch value) into a CMYK value by interpolation calculation based on the Lab value (Lch value) included in the color conversion table 37b and the CMYK value corresponding to the aforementioned Lab value (Lch value) in the color conversion table 37b.

After processing of S174, the color adjustment section 38b ends the color adjustment processing illustrated in FIG. 14.

As illustrated in FIG. 7, after the color adjustment processing of S103, the control section 38 prints, on a storage medium by the printer 34, the image obtained by the conversion from the RGB value into the CMYK value in S174 (S104). Then the control section 38 ends the operation illustrated in FIG. 7.

As described above, the MFP 30 adjusts a reproduced color, of a color included in an image, obtained with reference to the color conversion table 37b, based on positional relationship in the LAB color space between the reproduced color, of the representative color of the image, obtained by the display section 22 of the computer 20 and the reproduced color, of the representative color of the image, obtained with reference to the color conversion table 37b. Therefore, the reproduced color of the image targeted for printing can be brought closely to the reproduced color obtained by the display section 22 of the computer 20.

The MFP 30 captures a representative color of an image, that is, a dominant color of the image. Then the MFP 30 adjusts the dominant color. Therefore, the MFP 30 can print each image in an optimum reproduced color.

The MFP 30 suspends adjustment of a reproduced color, of a color present in the region 41, obtained with reference to the color conversion table 37b (YES in S166). With the configuration described above, the MFP 30 can reduce an amount of calculation required for a region which is included in the LAB color space and which provides little effect from reproduced color adjustment performed with reference to the color conversion table 37b. As a result, loads of converting a color of an image for printing can be reduced.

The MFP 30 calculates the five representative colors in the present embodiment but may calculate a different number (other than five) of representative colors.

The MFP 30 brings the reproduced color obtained by the printer 34 closely to the reproduced color obtained by the display section 22 of the computer 20 in the present embodiment. Note that the MFP 30 may bring the reproduced color obtained by the printer 34 closely to the reproduced color obtained by the display section 32 of the MFP 30.

The "image forming apparatus" of the present disclosure is an MFP in the present embodiment, but may be an image forming apparatus, such as a print-only machine, other than the MFP.

What is claimed is:

1. An image forming apparatus that prints an image, the image forming apparatus comprising:
   a central processing unit (CPU); and
   a storage section that stores a color conversion program, a color conversion table for printing the image by the image forming apparatus, and a display color conversion table for displaying the image by a computer, wherein
   through execution of the color conversion program, the CPU functions as:
   a representative color acquisition section that acquires a first representative color and a second representative color of the image; and
   a color adjustment section that adjusts a reproduced color, of a color included in the image, obtained with reference to the color conversion table, wherein
   the representative color acquisition section
   generates a data string including all RGB values that can be included in the image and respective frequencies of all the RGB values that can be included in the image,
   sequentially executes, on each of all pixels included in the image, processing for incrementing, by 1, a frequency of a RGB value of the pixel in the data string,
   deletes any RGB value with a frequency of 0 and the frequency of the RGB value with the frequency of 0 from the data string,
   assigns RGB values included in the data string with respective area IDs, the area IDs each being identification information attached to an individual region of a plurality of regions obtained by dividing an RGB color space,
   collects frequencies of the respective area IDs in the data string,
   sorts the data string in descending order based on the collected frequencies,
   registers an area ID with a highest frequency among the collected frequencies as a first area ID of the first representative color,
   acquires a second area ID that has a highest frequency among the collected frequencies next to the first area ID,
   determines whether or not a region to which the second area ID is attached and a region to which the first area ID is attached are close to each other,
   when it is determined that the region to which the second area ID is attached and the region to which the first area ID is attached are not close to each other, registers the second area ID as an area ID of the second representative color,
   acquires a first RGB value of the first representative color by way of averaging RGB values attached with the first area ID by multiplying the RGB values attached with the first area ID by respective frequencies corresponding to the RGB values attached with the first area ID, and
   acquires a second RGB value of the second representative color by way of averaging RGB values attached with the second area ID by multiplying the RGB values attached with the second area ID by respective frequencies corresponding to the RGB values attached with the second area ID,
   the color adjustment section
   acquires, from the storage section, the color conversion table and the display color conversion table,
   copies the color conversion table to generate an adjustment color conversion table,
   acquires a first point of a reproduced color, of the first RGB value of the first representative color in a LAB color space, obtained with reference to the color conversion table,
   acquires a second point of a reproduced color, of the first RGB value of the target first representative color in the LAB color space, obtained with reference to the display color conversion table,
   determines whether or not the first point is located in a region sandwiched between a "Red" hue plane and a "Red+Green" hue plane,
   when it is determined that the first point is not located in the region sandwiched between the "Red" hue plane and the "Red+Green" hue plane, calculates, on a hue plane where the first point is located, a third point at which a straight line passing through the first point and the second point intersects with an outer frame of a region of color reproduction with reference to the display color conversion table,
   determines whether or not the second point is included in a region of color reproduction by the image forming apparatus,
   when it is determined that the second point is included in the region of color reproduction by the image forming apparatus, adjusts the adjustment color conversion table in a manner such as to move the first point to the second point,
   adjusts the adjustment color conversion table in a manner such as to move a point near the first point towards the third point,
   acquires a fourth point of a reproduced color, of the second RGB value of the second representative color in the LAB color space, obtained with reference to the color conversion table,
   acquires a fifth point of a reproduced color, of the second RGB value of the target second representative color in the LAB color space, obtained with reference to the display color conversion table,
   determines whether or not the fourth point is located in a region sandwiched between the "Red" hue plane and the "Red+Green" hue plane,
   when it is determined that the fourth point is not located in the region sandwiched between the "Red" hue plane and the "Red+Green" hue plane, calculates, on a hue plane where the fourth point is located, a sixth point at which a straight line passing through the fourth point and the fifth point intersects with the outer frame of the region of color reproduction with reference to the display color conversion table, determines whether or not the fifth point is included in the region of color reproduction by the image forming apparatus, when it is determined that the fifth point is included in the region of color reproduction by the image forming apparatus, adjusts the adjustment color conversion table in a manner such as to move the fourth point to the fifth point, adjusts the adjustment color conversion table in a manner such as to move a point near the fourth point towards the sixth point, converts the RGB values of all the pixels included in the image into Lab values with reference to the adjustment color conversion table, and converts the Lab values into CMYK values with reference to the color conversion table.

2. The image forming apparatus according to claim 1, wherein the representative color acquisition section further acquires a third RGB value of a third representative color, a fourth RGB value of a fourth representative color, and a fifth RGB value of a fifth representative color, the color adjustment section adjusts the adjustment color conversion table based on the third RGB value, adjusts the adjustment color conversion table based on the fourth RGB value, and adjusts the adjustment color conversion table based on the fifth RGB value.

3. The image forming apparatus according to claim 1, wherein the RGB color space is divided into 48 ranges.

4. A non-transitory computer-readable storage medium storing therein a color conversion program to be executed by an image forming apparatus that prints an image, a color conversion table for printing the image by the image forming apparatus, and a display color conversion table for displaying the image by a computer, wherein the color conversion program causes the image forming apparatus to function as a representative color acquisition section and a color adjustment section, the representative color acquisition section acquiring at least one representative color of the image, the color adjustment section adjusting a reproduced color, of a color included in the image, obtained with reference to the color conversion table, the representative color acquisition section generates a data string including all RGB values that can be included in the image and respective frequencies of all the RGB values that can be included in the image, sequentially executes, on each of all pixels included in the image, processing for incrementing, by 1, a frequency of a RGB value of the pixel in the data string, deletes any RGB value with a frequency of 0 and the frequency of the RGB value with the frequency of 0 from the data string, assigns RGB values included in the data string with respective area IDs, the area IDs each being identification information attached to an individual region of a plurality of regions obtained by dividing an RGB color space, collects frequencies of the respective area IDs in the data string, sorts the data string in descending order based on the collected frequencies, registers an area ID with a highest frequency among the collected frequencies as a first area ID of a first representative color, acquires a second area ID that has a highest frequency among the collected frequencies next to the first area ID, determines whether or not a region to which the second area ID is attached and a region to which the first area ID is attached are close to each other, when it is determined that the region to which the second area ID is attached and the region to which the first area ID is attached are not close to each other, registers the second area ID as an area ID of a second representative color, acquires a first RGB value of the first representative color by way of averaging RGB values attached with the first area ID by multiplying the RGB values attached with the first area ID by respective frequencies corresponding to the RGB values attached with the first area ID, and acquires a second RGB value of the second representative color by way of averaging RGB values attached with the second area ID by multiplying the RGB values attached with the second area ID by respective frequencies corresponding to the RGB values attached with the second area ID, the color adjustment section acquires, from a storage section, the color conversion table and the display color conversion table, copies the color conversion table to generate an adjustment color conversion table, acquires a first point of a reproduced color, of the first RGB value of the first representative color in a LAB color space, obtained with reference to the color conversion table, acquires a second point of a reproduced color, of the first RGB value of the target first representative color in the LAB color space, obtained with reference to the display color conversion table, determines whether or not the first point is located in a region sandwiched between a "Red" hue plane and a "Red+Green" hue plane, when it is determined that the first point is not located in the region sandwiched between the "Red" hue plane and the "Red+Green" hue plane, calculates, on a hue plane where the first point is located, a third point at which a straight line passing through the first point and the second point intersects with an outer frame of a region of color reproduction with reference to the display color conversion table, determines whether or not the second point is included in a region of color reproduction by the image forming apparatus, when it is determined that the second point is included in the region of color reproduction by the image forming apparatus, adjusts the adjustment color conversion table in a manner such as to move the first point to the second point, adjusts the adjustment color conversion table in a manner such as to move a point near the first point towards the third point, acquires a fourth point of a reproduced color, of the second RGB value of the second representative color in the LAB color space, obtained with reference to the color conversion table, acquires a fifth point of a reproduced color, of the second RGB value of the target second representative color in the LAB color space, obtained with reference to the display color conversion table, determines whether or not the fourth point is located in a region sandwiched between the "Red" hue plane and the "Red+Green" hue plane, when it is determined that the fourth point is not located in the region sandwiched between the "Red" hue plane and the "Red+Green" hue plane, calculates, on a hue plane where the fourth point is located, a sixth point at which a straight line passing through the fourth point and the fifth point intersects with the outer frame of the region of color reproduction with reference to the display color conversion table, determines whether or not the fifth point is included in the region of color reproduction by the image forming apparatus, when it is determined that the fifth point is included in the region of color reproduction by the image forming apparatus, adjusts the adjustment color conversion table in a manner such as to move the fourth point to the fifth point, adjusts the adjustment color conversion table in a manner such as to move a point near the fourth point towards the sixth point, converts the RGB values of all the pixels included in the image into Lab values with reference to the adjustment color conversion table, and converts the Lab values into CMYK values with reference to the color conversion table.

5. A color conversion method in printing an image using a color conversion table by an image forming apparatus, the color conversion method comprising:

generating a data string including all RGB values that can be included in the image and respective frequencies of all the RGB values that can be included in the image;

sequentially executing, on each of all pixels included in the image, processing for incrementing, by 1, a frequency of a RGB value of the pixel in the data string;

deleting any RGB value with a frequency of 0 and the frequency of the RGB value with the frequency of 0 from the data string;

assigning RGB values included in the data string with respective area IDs, the area IDs each being identification information attached to an individual region of a plurality of regions obtained by dividing an RGB color space;

collecting frequencies of the respective area IDs in the data string;

sorting the data string in descending order based on the collected frequencies;

registering an area ID with a highest frequency among the collected frequencies as a first area ID of a first representative color;

acquiring a second area ID that has a highest frequency among the collected frequencies next to the first area ID;

determining whether or not a region to which the second area ID is attached and a region to which the first area ID is attached are close to each other;

when determining that the region to which the second area ID is attached and the region to which the first area ID is attached are not close to each other, registering the second area ID as an area ID of a second representative color;

acquiring a first RGB value of the first representative color by way of averaging RGB values attached with the first area ID by multiplying the RGB values attached with the first area ID by respective frequencies corresponding to the RGB values attached with the first area ID;

acquiring a second RGB value of the second representative color by way of averaging RGB values attached with the second area ID by multiplying the RGB values attached with the second area ID by respective frequencies corresponding to the RGB values attached with the second area ID;

generating an adjustment color conversion table by copying the color conversion table;

acquiring a first point of a reproduced color, of the first RGB value of the first representative color in a LAB color space, obtained with reference to the color conversion table;

acquiring a second point of a reproduced color, of the first RGB value of the target first representative color in the LAB color space, obtained with reference to the display color conversion table;

determining whether or not the first point is located in a region sandwiched between a "Red" hue plane and a "Red+Green" hue plane;

when determining that the first point is not located in the region sandwiched between the "Red" hue plane and the "Red+Green" hue plane, calculating, on a hue plane where the first point is located, a third point at which a straight line passing through the first point and the second point intersects with an outer frame of a region of color reproduction with reference to the display color conversion table;

determining whether or not the second point is included in a region of color reproduction by the image forming apparatus;

when determining that the second point is included in the region of color reproduction by the image forming apparatus, adjusting the adjustment color conversion table in a manner such as to move the first point to the second point;

adjusting the adjustment color conversion table in a manner such as to move a point near the first point towards the third point;

acquiring a fourth point of a reproduced color, of the second RGB value of the second representative color in the LAB color space, obtained with reference to the color conversion table;

acquiring a fifth point of a reproduced color, of the second RGB value of the target second representative color in the LAB color space, obtained with reference to the display color conversion table;

determining whether or not the fourth point is located in a region sandwiched between the "Red" hue plane and the "Red+Green" hue plane;

when determining that the fourth point is not located in the region sandwiched between the "Red" hue plane and the "Red+Green" hue plane, calculating, on a hue plane where the fourth point is located, a sixth point at which a straight line passing through the fourth point and the fifth point intersects with the outer frame of the region of color reproduction with reference to the display color conversion table;

determining whether or not the fifth point is included in the region of color reproduction by the image forming apparatus;

when determining that the fifth point is included in the region of color reproduction by the image forming apparatus, adjusting the adjustment color conversion table in a manner such as to move the fourth point to the fifth point;

adjusting the adjustment color conversion table in a manner such as to move a point near the fourth point towards the sixth point;

converting the RGB values of all the pixels included in the image into Lab values with reference to the adjustment color conversion table; and converting the Lab values into CMYK values with reference to the color conversion table.

\* \* \* \* \*